Oct. 13, 1970 M. CAMRAS 3,534,177

MAGNETIC TRANSDUCER HEAD HAVING ELECTRICALLY CONDUCTIVE CORE SUPPORTING MEANS SURROUNDED BY A MAGNETIC HOUSING

Filed April 5, 1967

INVENTOR.
MARVIN CAMRAS

BY Hill, Sherman, Meroni, Gross & Simpson ATTORNEYS

United States Patent Office 3,534,177

Patented Oct. 13, 1970

3,534,177

MAGNETIC TRANSDUCER HEAD HAVING ELECTRICALLY CONDUCTIVE CORE SUPPORTING MEANS SURROUNDED BY A MAGNETIC HOUSING

Marvin Camras, Glencoe, Ill., assignor to IIT Research Institute, Chicago, Ill., a corporation of Illinois Filed Apr. 5, 1967, Ser. No. 628,682

Int. Cl. G11b *5/10, 5/16, 5/42*

U.S. Cl. 179—100.2 4 Claims

ABSTRACT OF THE DISCLOSURE

In the illustrated embodiment, a high resolution transducer head is formed by assembling C-shaped core parts in conforming cavities of respective high conductivity insert blocks. The insert blocks are secured in notches in respective metal mounting blocks. The sub-assemblies are machined to form tape engaging surfaces, and a magnetic housing shell is inserted over the mated sub-assemblies with the core tape engaging surfaces exposed by means of a housing aperture. Also shown is a plural channel head assembly of similar construction. The heads have composite magnetic cores of a special construction providing reduced residual magnetization.

BACKGROUND OF THE INVENTION

An important problem in the video recording art relates to the need for higher resolution transducer heads which enable lower scanning speeds at a reasonable cost. Such transducer heads are particularly desired for fixed (non-rotating) head video recording and playback systems where low cost is a basic objective.

SUMMARY OF THE INVENTION

It is therefore an object of the present invention to provide an improved transducer head for video recording and playback systems, and an improved method for making such a head.

Another object of the invention is to provide a relatively inexpensive transducer head having a stable gap dimension of 50 microinches or less.

A further object of the invention is to provide a transducer head in accordance with one or more of the foregoing objects also having a particularly low susceptibility to residual magnetization.

A still further object of the invention is to provide a magnetic transducer head providing a stable high resolution gap dimension in spite of temperature changes.

Another and further object of the invention is to provide a relatively inexpensive readily manufactured magnetic head assembly for magnetic transducer systems.

Still further objects of the invention relate to methods for producing head assemblies having the characteristics previously expressed and which methods are particularly simple and inexpensive and lend themselves to efficient quantity production.

Other objects, features and advantages of the present invention will be apparent from the following detailed description taken in connection with the accompanying drawings.

DESCRIPTION OF THE PREFERRED EMBODIMENT

Figure 2:
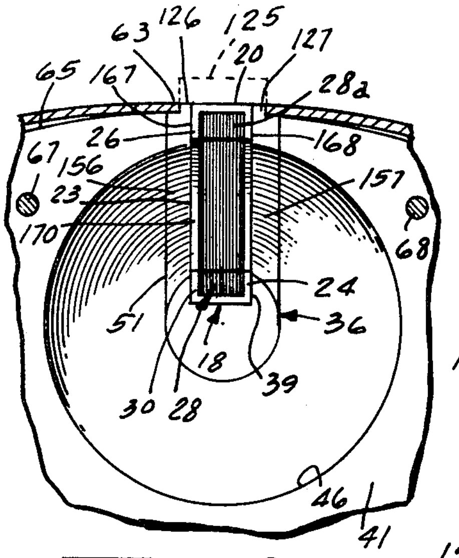
FIG. 2 is a partial transverse sectional view taken along the line II—II of FIG. 1.
Figure 1:
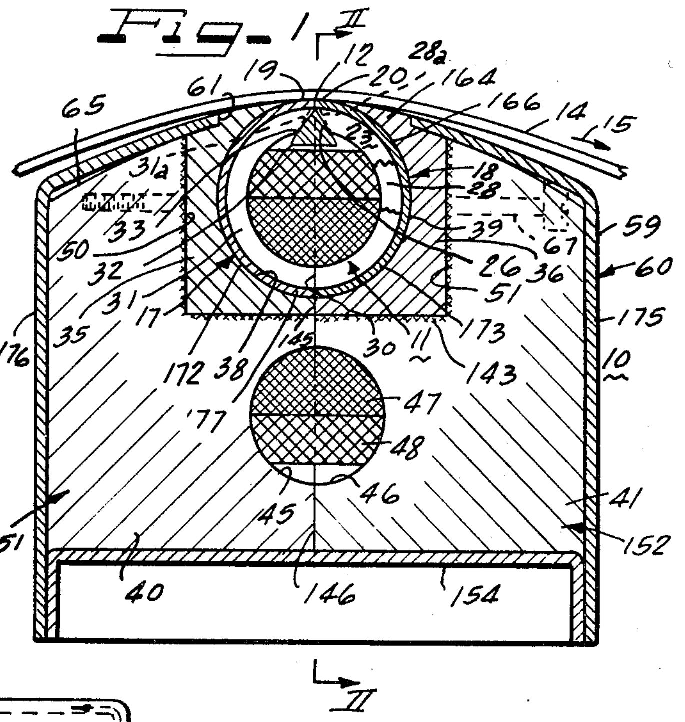
FIG. 1 is a somewhat diagrammatic longitudinal sectional view illustrating a head assembly in accordance with the concepts of the present invention.

Referring to FIG. 1 there is illustrated a magnetic head assembly 10 comprising a magnetic core 11 having a coupling gap 12 for coupling to a magnetic tape record medium 14 moving along a record medium path, for example in the direction of the arrow 15. The magnetic core 11 comprises a pair of generally semi-circular core members 17 and 18. The core members 17 and 18 have polar surfaces 19 and 20 adjacent coupling gap 12 which are in sliding contact with the magnetizable surface of the magnetic record medium 14. As illustrated in FIG. 2, the core member 18 has inturned side flanges 23 and 24 integral therewith. Each of the side flanges is beveled near the coupling gap 12 as indicated at 26 in FIG. 1.

Between the sides 23 and 24 of the core member 18 are a series of generally semi-circular laminations 28 of identical configuration. The auxiliary core parts or laminations 28 are substantially or essentially unstressed and extend in parallel relationship with suitable insulation between the successive laminations and between the laminations and the core member 18. The auxiliary core parts 28 have an exceptionally low coercive force and are in shunt with the main or working core member 18 which may have a higher coercive force. A suitable material is Supermalloy.

The laminations 28 may be essentially of the same configuration as the flange 23 partially shown in FIG. 1 except adjacent gap 12. Thus near gap 12, the laminations 28 may have bevel end faces as indicated at 28*a* terminating in spaced relation to and more distant from gap 12 than the bevel 26 of flange 23. The end faces of liminations 28 at the ends thereof remote from gap 23 may be flush with the end face 30 of flange 23 (see FIG. 1). The core member 17 may be of identical configuration with the core member 18 and may have laminations 31 identical to the laminations 28.

A mass of electrically highly conductive material such as copper may be disposed as indicated at 32 between and in conforming relation to the bevel faces such as 26 of the core member 18 and the corresponding bevel faces such as 33 of the core member 17. The electrically conductive mass 32 may be suitably insulated from the end faces 28*a* and 31*a* of the laminations 28 and 31.

The core members 17 and 18 are secured in confronting relationship by means of electrically conductive mounting means. In the illustrated embodiment, this mounting means comprises insert blocks 35 and 36 having cavities 38 and 39 therein conforming with and receiving the respective core members 17 and 18. The insert blocks 35 and 36 are of material of high electrical conductivity such as copper or silver. The insert blocks 35 and 36 are in turn secured to main mounting blocks 40 and 41 which may be made of a lower conductivity material which is more readily machinable, or can be cast, or has other advantageous features. Other advantageous characteristics of the material of the main mounting blocks 40 and 41 might comprise one or more of the following: ease of manufacture, for example easier to form, to machine or to polish; especially desirable dimensional stability; and the like. While the insert blocks or core mounting bodies 35 and 36 are preferably of copper, other high conductivity materials may be used, as for example silver, beryllium copper and other nonmagnetic metals or alloys of comparable conductivity, which may have superior wearing properties.

As illustrated in FIGS. 1 and 2, the main mounting blocks 40 and 41 are provided with respective annular cavities 45 and 46 for receiving windings 47 and 48. Each winding consists of a number of turns or coils encircling the lower part of the magnetic core 11, the winding 48 being wound on top of the winding 47.

The magnetic core receiving bodies 35 and 36 may be cast, welded, brazed, hard soldered or the like within the respective cavities 50 and 51 of the main mounting blocks 40 and 41. Alternatively, the entire mounting means for the magnetic cores can be of copper or other comparable high conductivity material with cavities machined or pressed (coined) such as indicated at 38, 39, 45, and 46.

Figures 3, 4, 5:
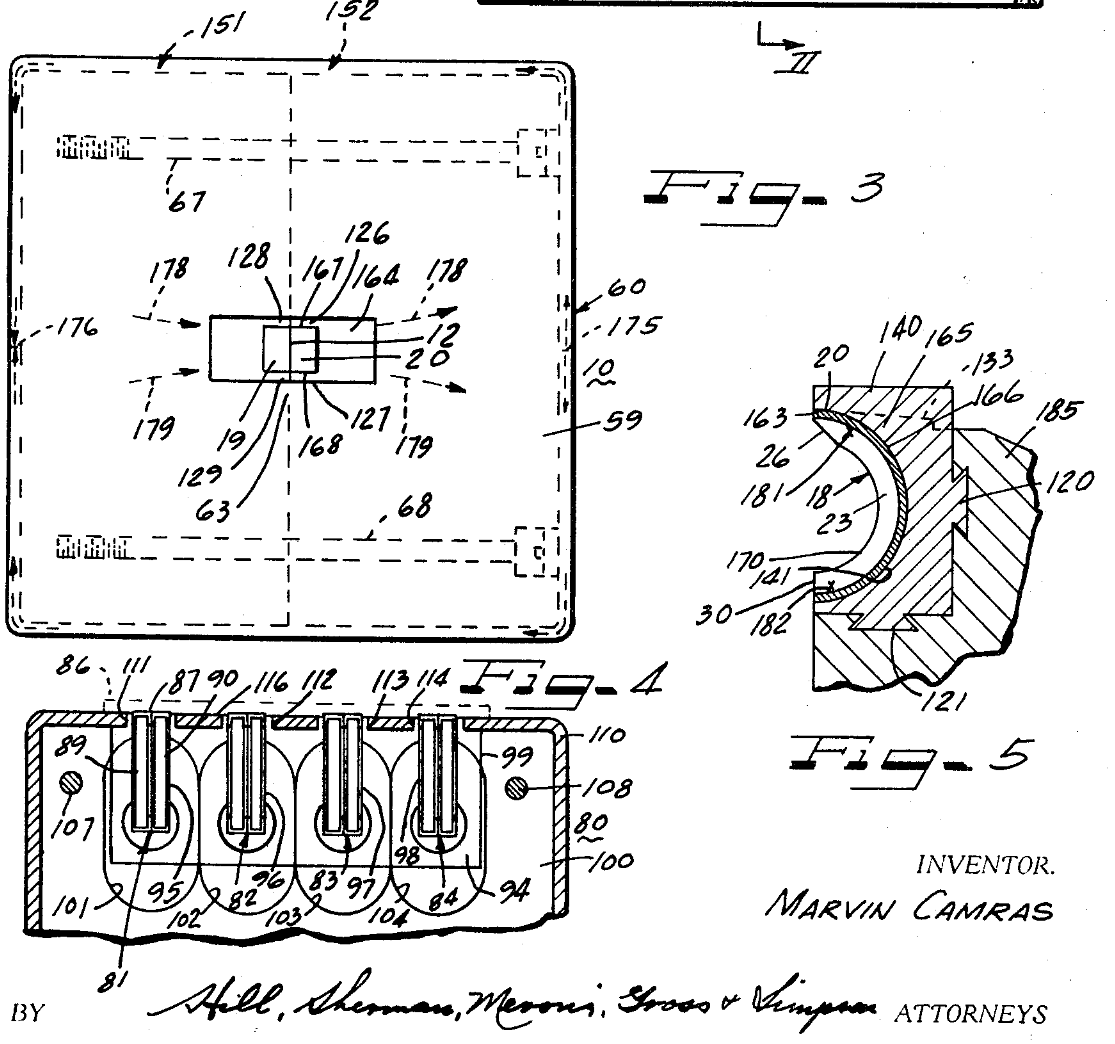
FIG. 3 is a somewhat diagrammatic top plan view of the head assembly of FIG. 1.
FIG. 4 is a partial transverse sectional view somewhat diagrammatic in nature and similar to FIG. 2 but illustrating a multichannel head assembly.
FIG. 5 is a partial longitudinal sectional view similar to that of FIG. 1 but illustrating a modification thereof.

As indicated in FIGS. 1 and 2, a shell part 59 of a casing 60 of magnetic material may fit over the mounting means 35, 36, 40, 41 in contacting relation thereto at the crest of the top face, and at the side faces of the mounting means. The casing 60 is provided with an elongated aperture 61 as best seen in FIG. 3 and through which the polar faces 19 and 20 are exposed for sliding contact with the magnetizable surface of the record medium 14. The upper surface 63 of casing 60 may be in sliding contact with adjacent channels of the record medium 14 and may be substantially flush with the polar faces 19 and 20 where these polar faces engage an active channel of the record medium 14. As seen in FIG. 2, the top surface 65 of the mounting means may be slightly crowned in the lateral direction and the casing 60 may have a generally corresponding crown so that the tape will be slightly concave as viewed in cross-section in FIG. 2.

The two half sections or sub-assemblies 35, 40 and 36, 41 of the mounting means together with the respective magnetic core sub-assemblies including core members 17 and 18 with their respective magnetic laminations 28 and 31 may be secured in mating relationship with a suitable gap spacer defining coupling gap 12 by any suitable means such as screws 67 and 68, FIG. 3.

FIG. 4 illustrates a magnetic head assembly 80 including head units 81–84 having respective coupling gaps for coupling to respective channels of a magnetic record medium 86. Each of the head units may be formed of a pair of generally semi-circular head sub-assemblies such as indicated at 87 and each head sub-assembly may be formed of a plurality of magnetic core sub-assemblies such as indicated at 89 and 90. The magnetic core sub-assemblies 89 and 90 may be identical to the magnetic core sub-assembly 18, 28 shown in FIGS. 1 and 2. A longitudinal sectional view of each of the head units 81–84 would correspond essentially, for example, to the arrangement shown in FIG. 1, that is a ring type magnetic core with a coupling gap and with polar surfaces such as 19 and 20 across which the record medium 86 successively travels in sliding contact. The record medium would be in sliding contact with the polar surfaces of each of the magnetic core sub-assemblies such as 89 and 90.

In the arrangement illustrated in FIG. 4, a single highly conductive insert block or magnetic core receiving body 94 is indicated having respective recesses 95–98 receiving the respective head sub-assemblies such as 87 of the head units 81–84. Also as illustrated in FIG. 4 the insert block 94 is secured in a cavity 99 of a main mounting block 100. The main mounting block 100 has successive cavities 101–104 for receiving individual winding assemblies which may be identical to the winding assemblies 47, 48 shown in FIG. 1. Two channel assemblies are shown in each cavity to give a wider head than in FIG. 2. Such a construction with two or more channel pieces per cavity allows the low losses of thin core materials and large surface areas for skin effect flux carrying, and gives increased strength and support at the tape contacting portion of the cores.

The head assembly 80 would correspond to the head assembly 10 of FIG. 3 in having means such as indicated at 107 and 108 in FIG. 4 for securing the two halves of the head assembly together and then being provided with a casing 110 of magnetically soft material. The casing 110 is provided with apertures 111–114 corresponding to the aperture 61 of casing 60 for exposing the polar surfaces of the head units 81–84 for sliding contact with the record medium 86. The upper surface 116 of casing 110 serves as a magnetic keeper surface contacting the channels of the magnetic record medium 86 which are located out of alignment with the head units 81–84. For example, the head units 81–84 may have a spacing therebetween slightly exceeding the width of the magnetized tracks recorded by the head units so that the head assembly 80 may be shifted relative to the record medium by a distance approximately equal to the width of the head units to cause the head assembly to scan a second set of channels.

As in the previous embodiment, the entire mounting means may be formed of only two blocks of copper or other high conductivity material with cavities machined or pressed (coined) to receive the respective head units 81–84. Alternatively, instead of a single pair of insert blocks such as insert block 94 shown in FIG. 4, separate insert blocks may be utilized for each head unit, the main mounting blocks such as mounting block 100 being provided with individual cavites for receiving the respective individual insert blocks.

By way of example, in each embodiment where a mounting means is utilized including a high conductivity insert block and a main mounting block of lower cost material or the like, the main mounting block may be formed of brass or bronze, for example. The main mounting blocks in each of the embodiments may be formed of die cast material, for example. The insert blocks may have ears such as indicated at 120 and 121 in FIG. 5. In FIG. 5, core subassemblies such as 18 are shown with the laminations 28 broken away completely to show the configuration of the side flanges such as 23. In each embodiment the insert blocks may initially have a height dimension to project above the main mounting block such as 41, FIG. 2 and be machined down to the configuration illustrated in FIG. 2. In FIG. 2 the initial configuration of the mounting means is indicated by the dot dash line 125, material being removed as indicated by dash line 133 in FIG. 5 to leave side support portions such as indicated at 126 and 127 in FIG. 2 and at 126–129 in FIG. 3 at each side of each of the head subassemblies, the final finishing of the top surfaces of support portions 126–129 being done after final assembly with housing 60 in place.

The illustrated constructions are extremely stable, allowing coupling gaps such as indicated at 12 having a dimension in the direction of tape movement of 50 microinch (1 microinch equals one millionth of an inch) or below (down to 10 microinch or less) that are maintained through changes of temperature. The constructions minimize stress of magnetic core member such as 17, 18 and particularly portions 28 and 31 are supported in a stress free condition.

One method of making the head assembly of FIGS. 1–3 may be outlined as follows:

(1) Respective blocks such as insert block 36, FIG. 2, (before machining at 125—see insert block 140, FIG. 5) of silver or the like are formed with recesses such as indicated at 39 (machined or coined) so as to receive magnetic core subassemblies such as that indicated at 18, 28 in FIGS. 1 and 2. Alternatively the insert blocks are solid, with the recesses formed in step 2.

(2) The silver insert blocks 35 and 36 are soldered into the respective receiving recesses 50 and 51 of the main mounting blocks 40 and 41, for example along the interface indicated by the successive cross lines at 143, FIG. 1. The mating faces such as 145, 146 of the resultant subassemblies 151 and 152 are semi-finished. The recesses 38 and 39 may then be formed or finished.

(3) The winding cavities such as indicated at 45 and 46 are formed as by machining or coining if these cavities are not already in the blank blocks.

(4) The filler portions 28, 31 are coated with insulating material such as a magnesium oxide film, inserted between the side flanges of cores 17 and 18 and annealed for best magnetic properties. The core assemblies are then secured at the outer surfaces of cores 17 and 18 by epoxy adhesive to the walls of cavities 38 and 39. The mating faces of cores 17 and 18, especially at gap 12, are finished to optical flatness.

(5) The winding assembly such as 47, 48 is inserted between two mating subassemblies 151 and 152, the gap spacer is inserted at 12, and the subassemblies are secured together for example by screw means 67, 68 of FIG. 3.

(6) The mated subassemblies 151 and 152 are then machined at the tape engaging polar surfaces as represented by the material removed between the dot dash line 125 and the solid lines in FIG. 2, and the magnetic casing shell 59 is secured over the other parts as represented in FIG. 1, a bottom magnetic closure being applied at 154 to complete casing 60.

An alternative method of making the head would follow the preceding method steps except that the insert blocks such as 35 and 36 would be formed with both the magnetic core receiving recesses 38 and 39 and the winding cavities such as indicated at 156 and 157 in FIG. 2 prior to assembly of the insert blocks with the main mounting blocks 40 and 41.

The two same alternative methods may be utilized essentially in the production of the head assembly 80 of FIG. 4. The screws such as 67, 68 in FIGS. 1–3 and 107, 108 in FIG. 4 are preferably located at a level generally half way between the level of the front polar edge faces defining the coupling gap 12 and the back edge faces such as 30, as has been indicated in FIGS. 1 and 2 and in FIG. 4.

The following specific dimensions for the head of FIGS. 1–3 are given for the purpose of example only, and should not be construed as limiting the scope of the invention. The core parts 17 and 18 may be formed of .002 inch thick Supermalloy with an outside diameter of .110 inch and with a transverse or width dimension (at 20 in FIG. 2) of .020 inch. The filler laminations 28, 31 may be made of .0005 inch thick Supermalloy. (Supermalloy comprises 5% molybdenum, 79% nickel, and the remainder iron and impurities.) The winding 47 may comprise 450 turns of No. 48 (American Wire Gauge) wire while the winding 48 may comprise 150 turns of No. 46 (American Wire Gauge) wire wound on top of the winding 47.

During recording a video signal together with superimposed high frequency bias may be supplied to the winding 48 only, while the winding 47 may have a resistor (for example 1800 ohms) connected across its terminals, or the winding 48 may be short circuited for lowest impedance and highest resonance frequency. During playback, windings 47 and 48 may be connected so as to be in series opposing relation at frequencies below the resonance frequency of the winding 47. With this connection of windings during playback, the electromotive forces induced in the windings 47 and 48 will be in aiding relation for frequency components of the recorded signal between the resonant frequency of winding 47 and the resonant frequency of the winding 48 so as to provide an appreciably greater output in this frequency range. It is also possible to connect the windings 47 and 48 in series aiding relation with respect to frequencies below the resonance frequency of the winding 47 so that at low frequencies the induced electromotive forces in the two windings will be in phase to provide low frequency boost.

Referring to FIG. 5, for example, it will be appreciated that the present invention contemplates a method of making a magnetic core subassembly for a magnetic head which comprises securing a magnetic core part such as indicated at 18 within a conforming recess such as indicated at 141 of a block 140 of electrically conductive material, removing material from the block of electrically conductive material, for example down to a line such as indicated at 133 in FIG. 5 to expose a polar surface 20 of the magnetic core part for sliding contact with a magnetic record medium, thereby to form a magnetic core subassembly, and finishing the subassembly as by polishing the gap defining edge face 163 to optical flatness so that the subassembly is adapated to form part of a magnetic head such as indicated in FIG. 1 or FIG. 4 while leaving a major portion of the magnetic core part which is to confront the record medium path covered by electrically conductive material of the block 140 (see the electrically conductive material indicated at 164 in FIG. 1 and at 165 in FIG. 5). It will be appreciated that not only the radially outer surfaces such as 166 of the magnetic core part 18 which directly confront the record medium path are covered, but the lateral exterior surfaces 167 and 168 (FIGS. 2 and 3) of the core part 18 adjoining the surface portions 20 and 166 have at least a major portion thereof covered and are shown substantially completely covered. As previously mentioned, the upper edge faces 126–129 of the blocks 35 and 36 may be slightly below the level of the polar surfaces 19 and 20 when the blocks are of copper so as to be out of contact with the magnetic record medium. If the blocks 35 and 36, 94 and 140 are of aluminum, for example, the surfaces such as 126–129 may be flush with the polar surfaces 19 and 20, so that the entire area of side surfaces 167 and 168 are covered. In any event, side surfaces 167 and 168 of the magnetic core part 18 are substantially fully covered by the electrically conductive material of the block in the illustrated head.

Referring to FIG. 5, the block 140 has a curved face (corresponding to face 156, FIG. 2, of block 36) flush with the surface 170 of core part 18, and it is in this surface that the recess 141 is formed. The surface 170, of course, defines part of the toroidal cavity such as the cavity indicated at 46 in FIG. 2.

It will also be observed that the electrically conductive material of the block covers the exterior surfaces such as 172 and 173, FIG. 1, of the core parts 17 and 18 which confront the keeper housing shell 59 so as to tend to prevent leakage flux through this housing part from one side of the electric windings 47, 48 to the other side of the electric windings 47, 48. Referring to FIG. 1, at the level of the center opening of windings 47 and 48, portions of the housing part 59 such as indicated at 175 and 176 surround the base 177 of the magnetic core 11 so as to provide potential leakage flux paths from the portion of the core base 177 to the right of windings 47, 48 and from portion 175 to portion 176 (about the perimeter of the case 59 as indicated by the dotted arrows 178 and 179 in FIG. 3) to return to the portion of base 177 to the left of the windings 47, 48.

It will be appreciated that the core parts 17 and 18 need not be of identical configuration so as to define a circular magnetic core, that one of the polar surfaces 19 and 20 may be offset and out of contact with the magnetizable surface of the tape record medium 14, and that only one of the core parts 17 and 18 could be formed by the method of the present invention while still achieving substantial advantages over the prior art. Each of the embodiments of FIGS. 1 through 5 is disclosed both for the case where filler laminations such as 28 and 31 are present, and for the case where these filler laminations are omitted.

In each embodiment, the volume occupied by the electrically conductive material of windings such as 47, 48 is substantially greater than the volume of the magnetic core such as 11, preferably being two to five (or more) times the volume of the magnetic material of the core. This is particularly advantageous when the head is used to record frequency components in the megacycle range, or where short gaps or especially low residual magnetization or thermal noise levels are desired.

The triangular member 32 may be omitted and the winding 48 extended to substantially completely fill the space otherwise occupied by the member 32.

The auxiliary laminations 28 and 31 are preferably very carefully heat treated for lowest coercive force. Commercial data shows that values of D.C. coercivity (as measured from direct current saturation) for commercially available Supermalloy may have a range from 0.003 to 0.009 oersted. The laminations 28 and 31 are preferably mounted in unstressed condition but with good magnetic contact at regions such as indicated at 181 and 182 in FIG. 5, adjacent the respective opposite ends of the cores 17 and 18. Thus each lamination 28 preferably firmly contacts core 18 at regions 181 and 182, and the ends of each of the laminations 31 preferably firm contact the core 17 at corresponding regions adjacent the respective opposite ends of core 17, so that the laminations 28 and 31 serve to efficiently divert residual magnetic flux due to residual magnetization of the core parts 17 and 18 from the path of the record medium. The good magnetic contact of laminations 28 at 181 and 182, for example, is desirable to provide a head exhibiting low residual magnetization and improved magnetic efficiency.

The coercive force of the main core parts 17 and 18 is preferably as low as possible but may be considerably higher than laminations 28 and 31 even when the same material (such as Supermalloy) is used because stressed are produced in polishing the gap surfaces such as 163, FIG. 5, and because the tape contacting surfaces 19 and 20 are abraded by tape 14 during use of the head. Also the main core parts 17 and 18 must be held firmly enough so that gap 12 will remain essentially unchanged during the life of the head.

Where the magnetizable surface of the tape 14 is to come into direct contact with copper, silver, or other relatively soft metal which has a tendency to adhere to the material of the pole pieces 19 and 20, it is useful to charge the tape with graphite or a graphite substance such as molybdenum disulfide. For this puropse, the magnetizable surface of the tape may be run over a block of graphite material, or the graphitic substance may be incorporated as part of the tape coating formulation. The thickness of the graphic layer overlying the magnetizable surface of the tape record medium should approach molecular dimensions, and is preferably not over a few microniches thick.

In operating a head having a construction of the general type disclosed herein for recording, a bias current of the order of 7 milliamperes r.m.s. (root mean square value) at a bias frequency of 3 to 10 megacycles per second was supplied to winding 48, superimposed on a signal current to winding 48 of about 0.7 milliamperes r.m.s. at video frequencies.

For the sake of a clearer indication, the location of the beveled end faces **28*a* and 31*a* of laminations 28 and 31 have been indicated by dash lines in FIG. 1. With normal drawing conventions, line 28*a* would not appear in FIG. 1 since laminations 28 have been broken away at this section. Line 31*a* would normally appear as a solid line in FIG. 1 but so showing line 31*a* might lead to confusion between lines 31*a* and 33 in FIG. 1. The reference numeral 185 in FIG. 5 designates a mounting block generally corresponding to block 41** of FIGS. 1 and 2.

It will be apparent that many modifications and variations may be effected without departing from the scope of the novel concepts of the present invention.

I claim as my invention:

1. A magnetic transducer head assembly comprising
- a pair of confronting magnetic core parts defining a coupling gap therebetween,

- a pair of insert blocks of electrically conductive material having confronting surfaces lying substantially in the plane of said coupling gap and having recesses in said confronting surfaces receiving the respective magnetic core parts, and
- a pair of metal mounting blocks having mating surfaces lying substantially in the plane of said coupling gap and having notches in said mating surfaces receiving said insert blocks.

2. A magnetic transducer head assembly comprising a pair of confronting magnetic core parts defining a coupling gap therebetween for coupling to a magnetic record medium and together forming a magnetic core of ring confrontation with a base portion remote from the coupling gap,
- a pair of blocks of electrically conductive material having mating surfaces lying substantially in the plane of the coupling gap, and
- a housing of magnetic material having an interior configuration substantially corresponding to the external configuration of the blocks when disposed in confronting relation at their mating surfaces and closely receiving the pair of blocks therein,
- said mating surfaces having cavities therein defining a toroidal winding space and having respective recesses adjoining said cavities in which the respective magnetic core parts are secured, the electrically conductive material of the blocks overlying substantially the entire external surface area of the core, and
- said blocks having electrically conductive winding means substantially filling said toroidal winding space and encircling the base portion of the magnetic core, the volume occupied by the electrically conductive material of the winding means being at least two times the volume of the magnetic material of the core, said electric winding means being operable to transduce signal components in the megacycle range.

3. The transducer head of claim 2 with said winding means comprising a first winding having a relatively large number of turns wound on the base portion of the magnetic core and a second winding having a lesser number of turns and wound over the first winding radially outwardly of the first winding and in encircling relation to the first winding, said magnetic core having a central window forming part of the toroidal winding space, and the first and second windings together substantially filling said central window.

4. A magnetic transducer head assembly according to claim 2 with said housing having an aperture receiving a portion of the magnetic core including a coupling gap, said core providing polar surfaces for sliding contact with a magnetic record medium, and the blocks having upper faces surrounding said polar surfaces of the magnetic core but being slightly below the level of said polar surfaces so as to be out of contact with the magnetic record medium.

References Cited

UNITED STATES PATENTS

| | | | |
|---|---|---|---|
| 2,683,774 | 7/1954 | Camras | 179—100.2 |
| 2,852,618 | 9/1958 | Hansen | 179—100.2 |
| 2,999,135 | 9/1961 | Wiegand | 179—100.2 |
| 3,019,303 | 1/1962 | Bauer et al. | 179—100.2 |
| 3,026,379 | 3/1962 | Carpenter | 179—100.2 |
| 3,211,843 | 10/1965 | Dundovic et al. | 179—100.2 |

STANLEY URYNOWICZ, Jr., Primary Examiner

J. RUSSELL GOUDEAU, Assistant Examiner

U.S. Cl. X.R.

29—603; 340—174.1